Dec. 26, 1933.  H. E. HONEYWELL  1,940,950
AIR BRAKE
Filed Jan. 5, 1931
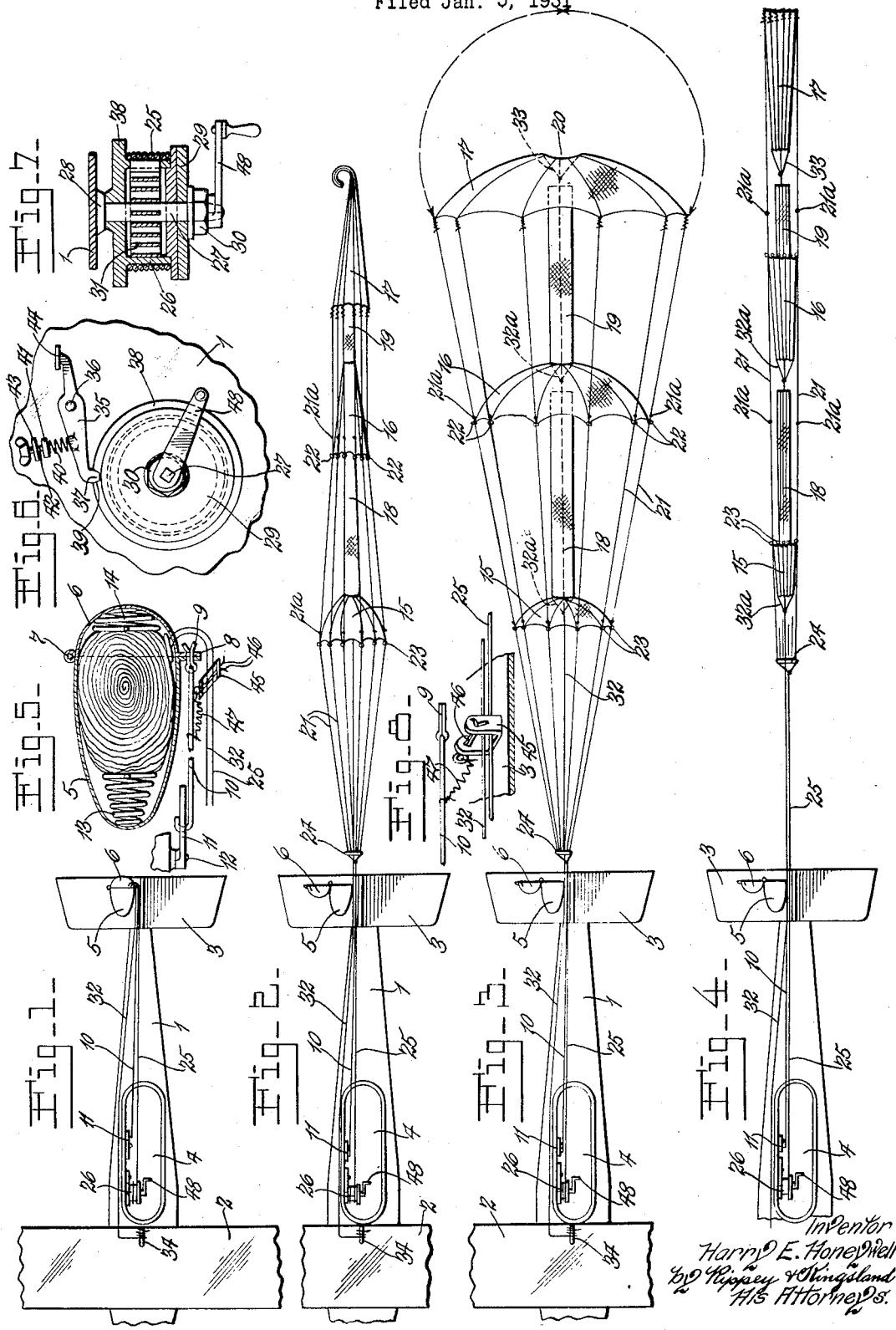
Inventor
Harry E. Honeywell
by Rippey & Kingsland
His Attorneys Patented Dec. 26, 1933

1,940,950

UNITED STATES PATENT OFFICE 1,940,950

AIR BRAKE

Harry E. Honeywell, Clayton, Mo.

Application January 5, 1931. Serial No. 506,525

14 Claims. (Cl. 244—21)

This invention relates to air brakes; and has special reference to devices for use in connection with aircraft to check and reduce the speed of travel of the aircraft during emergencies or during landing and is also useful as an aid to the pilot in regaining control of the aircraft as, for instanace, during tailspin.

An object of the invention is to provide an improved device for use in connection with aircraft and means for operating and controlling said device whereby said device may be caused to function as a brake or retarder to reduce the speed of flight or descent of the aircraft, thus enabling the pilot to stop within a shorter distance or to regain control of the aircraft before a crash occurs.

Another object of the invention is to provide means for disabling the device after it has performed its intended function, so that said device will no longer retard the flight of the aircraft; and also to provide means for reconditioning the device to perform its function.

Other objects will appear from the following description, reference being made to the accompanying drawing, in which—

Fig. 1 is a plan view of an airplane showing the invention in connection therewith.

Fig. 2 is a similar view showing the invention beginning to function as a brake or retarder for the airplane.

Fig. 3 is a similar view showing the device functioning as a brake or retarder for the airplane.

Fig. 4 is a similar view showing the device disabled or conditioned, so that it will not retard the flight of the airplane.

Fig. 5 is a sectional view showing the housing within which the device is stored when not in use.

Fig. 6 is a side elevation of the device that controls the functioning of the air brake or retarder.

Fig. 7 is a sectional view of the device shown in Fig. 6.

Fig. 8 is a perspective view of a detail of the invention.

The airplane that is shown diagrammatically in Figs. 1 to 4, inclusive, comprises the usual fuselage 1, wings 2, stabilizer 3 and pilot cockpit 4.

A shell casing 5 is attached to some fixed part of the airplane and for convenience of illustration is shown attached to the stabilizer 3, although it is to be understood that this shell may be mounted in any appropriate position. The shell 5 is completely closed except at its rear end and the open rear end of said shell is provided with a closure 6 connected with the shell 5 by a hinge 7, which permits said closure to be closed, as shown in Figs. 1 and 5, or opened, as shown in Figs. 2, 3 and 4 of the drawing. The shell 5 and the closure 6 have abutting extensions 8 provided with holes through which the fastener 9 may be extended to hold the closure in closed position. The fastener 9 is shown as a cotter pin having its stem passing rearwardly through the holes in the extensions 8 and the two portions of the stem spread apart so as to hold the cotter pin in position and yet permit said cotter pin to be withdrawn forwardly. A link 10 has its rear end pivoted to the cotter pin 9 and its forward end pivoted to a lever 11. The lever 11 is mounted on a pivot 12 located in the cockpit 4 adjacent to the pilot, so that the pilot may conveniently engage and operate said lever 11 and quickly withdraw the cotter pin 9 from its engagement with the extension 8 and thus quickly release the closure 6 and permit the air brake or retarder to be ejected from the shell 5.

An ejector spring 13 is mounted within the shell 5 and is compressed when the retarder is within said shell, so that when the closure 6 is opened the spring 13 expands and immediately ejects the brake or retarder from the shell 5. A similar spring 14 is secured within the closure 6 and presses against the adjacent end of the retarder or brake and thereby cooperates to store up energy in the spring 13, so that said spring 13 will quickly expand and eject the brake or retarder from the shell in the intended manner.

In the embodiment of the invention shown, the brake or retarder comprises a number of elements somewhat similar to an umbrella or to a parachute and including the element 15 at the front, the element 16 rearwardly from the element 15 and of larger area and the element 17 rearwardly from the element 16 and of larger area. The element 15 has a central hole opening into a tube or sleeve 18 of pliable material which extends into the element 16, when the device is in use so as to permit air to pass through the hole at the center of the element 15 and thence through the tube 18 and against the center of the element 16. Similarly the element 16 has a central hole opening into an attached pliable tube 19 that extends rearwardly into the element 17 adjacent to the central hole 20 through said element 17 to expedite the opening and functioning of said elements.

A series of cords 21 have their rear ends attached to the marginal portions of the element 17. These cords extend forwardly through eyelets 22 on the marginal portion of the element 16 and through eyelets 23 on the marginal portions of the element 15. Thus, these cords converge forwardly and have their forward ends attached to a uniting member or body 24. The cords 21 have knots or knobs 21ᵃ to abut against the rear of the eyelets 22 and 23 to hold the elements 15 and 16 in umbrella form. From the uniting member or body 24, a cord or cable 25 extends forwardly to connection with a reel 26 on which the cord or cable 25 may be wound. The reel 26 is mounted on an axial support 27 and is frictionally clamped between an abutment 28 and a plate 29, a nut 30 being screwed on the axle 27 to obtain this clamping arrangement. A strong spring 31 is mounted within the reel 26 having one end attached to the axle 27 and the other end attached to the reel in a manner such that when the cord or cable 25 is pulled toward the rear, the reel 26 will be turned in a direction to place the spring 31 under tension, to prevent backlash and to return the elements 15, 16 and 17 to open position preparatory to being rolled up and placed in the shell 5.

A cord or cable 32 has a bifurcated portion 33 at its rear end attached to the margin of the element 17 around the opening 20. This cord or cable 32 extends forwardly through the tubes 19 and 18 and through the body 24 to connection with a part 34 that is rigid with the airplane, and has bifurcated portions 32ᵃ connected with the margins of the elements 15 and 16 around the central holes in said elements.

A lock 35 is mounted on a pivot 36 and has an end 37 pressed into contact with the periphery of a circumferential flange 38 on the reel 26 and arranged to engage in a notch 39 in said flange. A spring 40 has one end seated against the lock 35 and the opposite end against an abutment 41 on the end of a screw 42 mounted in a bracket 43 and adjustable to vary the tension of said spring 40. When the cord or cable 25 is wound on the reel 26 to prevent rearward sliding movement of the body 24 along the cord or cable 32, the body 24 is held in a position in which the elements 15, 16 and 17 will positively be held in substantially the relationship shown in Fig. 3 of the drawing, presenting concave surfaces toward the rear end of the airplane to catch the air and thus retard the speed of movement of the airplane. This effective function of the cord 25 in cooperation with the reel 26 may be described as preventing the elements 15, 16 and 17 from turning inside out and/or holding said elements in effective position.

Now, if it be desired to disable the elements 15, 16 and 17 and permit them to turn inside out and assume ineffective positions, it is only necessary to engage the handle 44 of the lock 35 and disengage the end 37 from the notch 39. This will permit the reel to unwind under the pressure applied thereto by the elements 15, 16 and 17 and thus permit the marginal portions of said elements to fold and extend rearwardly and assume ineffective positions by turning inside out in the manner sufficiently shown in Fig. 4 of the drawing and remain so at will of the operator-pilot.

A fixed part of the airplane adjacent to the casing 5 supports a bracket 45 over which the cords or cables 25 and 32 extend. A cotter pin 46 is normally mounted in the bracket 45 and holds the cords or cables 25 and 32 from rising. When it is desired to permit the cords or cables 25 and 32 to rise vertically from the reel 26 and the part 34, the lever 11 is moved an additional distance beyond which it had been moved to release the cotter pin 9. This additional movement of the lever 11 takes up a slack in the connection 47 between the link 10 and the pin 46 and withdraws said pin 46 from the bracket 45. This disconnects the cords or cables 25 and 32 from the rear end of the airplane and permits them to extend upwardly as described.

Normally, and when this device is not in use, it is rolled upon itself beginning at the rear end of the device and rolling it forwardly to the shell 5. The device being composed of thin and durable material occupies comparatively little space and is receivable in the shell 5 as shown and described. The device is kept in the shell until an emergency demanding the use of the device arises, such, for instance, as the airplane going into a tailspin; or until it may be desired to use the device in landing or for some other purpose. When the need to use the device arises, it is only necessary to operate the lever 11 a distance sufficient to detach the cotter pin 9 from the extensions 8 and thus permit the spring 13 to act to eject the device from the shell 5. Since the airplane is in motion, the ejected device extends to the rear and unrolls, as will be understood by reference to Fig. 2 of the drawing, and eventually opens, as shown in Fig. 3, thus effectively retarding the speed of flight of the airplane or retarding a tailspin until the pilot can regain control.

After the need for use of the device has ended, the lock 35 is released from the reel 26, permitting the device to assume an ineffective position by permitting the elements 15, 16 and 17 to turn inside out and thus present no substantial resistance to the travel of the airplane. After the device has thus been used and at the opportune time, it is again rolled up and placed within the shell 5.

A crank 48 is releasably engageable with the axle 27 to rotate said axle to tension or unwind the spring 31 whenever it may be advisable to do so; and to restore the elements 15, 16 and 17 to the positions and adjustments shown in Fig. 3.

The construction and arrangement of the elements of this device may be varied substantially within equivalent limits without departure from the scope and principle of the invention. I contemplate such variations as may be found desirable to adapt the invention to its intended uses and what I claim and desire to secure by Letters Patent is:

1. A device of the class described having a parachute element, a plurality of cords each in engagement with the peripherial portion of said parachute element and secured at their inner ends to a uniting member, a cable attached to said parachute element at a central part thereof, passing through said uniting element and secured at its inner end to a fixed support, a cable secured to said uniting member and wound upon a reel, a spring pressed pawl adapted to engage and hold said reel whereby said uniting element is secured to said support, and means on said pawl for manual engagement whereby said reel may be released.

2. A device of the class described having a parachute element, a plurality of cords each in engagement with the peripherial portion of said parachute element and secured at their inner ends to a uniting member, a cable attached to the parachute element at a central part thereof, passing through said uniting element and secured at its inner end to a fixed support, a cable having one end secured to said uniting member and its other end wound upon a reel, a helical spring to give tension to the reel, a spring pressed pawl adapted to engage and hold the reel, and means on the pawl for manual engagement whereby the reel may be released.

3. In combination with an aircraft, a parachute, a cable having one end secured to the parachute and the other end centrally of the aircraft, a guide for the cable near the rear end of the aircraft, a casing for the parachute, means for releasing the parachute from the casing, means for releasing said guide, and a lost motion connection between the means for releasing the parachute and the means for releasing the guide.

4. In combination with an aircraft, a parachute, a cable secured at one end to said parachute and at its other end to a support centrally of said aircraft, a guide for said cable near the rear of said aircraft, a casing for said parachute, a releasable cover for the casing, means for holding said cover in closed position, an element adapted by lateral movement to withdraw said holding means, means for releasing said guide, and a lost motion connection between said element for releasing the holding means and the guide releasing means whereby a partial lateral movement of said means will release the casing and further movement will operate the guide releasing means.

5. A device of the class described having a series of parachute elements of graduated sizes adapted to assume a superimposed position, a series of cords each in engagement with the periphery of the outer parachute element and converging forwardly to connection with each of said other parachute elements at the peripherial portions thereof and secured at their inner ends to a uniting member, a flexible tube attached to each of said parachute elements other than the element at the rear and extending rearwardly toward the next adjacent element, a cable attached to each of said elements at a central part thereof, passing through said tubes and through said uniting element and secured at its inner end to a fixed support, means for securing said uniting element relative to said support whereby the parachute elements may expose a concave surface to air currents, and means whereby said securing means may be released and thereby permit said parachute elements to collapse.

6. A device of the character described comprising a series of parachute elements of graduated sizes adapted to assume a superimposed position, a series of cords each having permanent engagement with the periphery of the outer parachute element and converging forwardly and having sliding engagement with the peripheries of the remaining parachute elements, a uniting member attached to the forward ends of said cords, a cable attached to a central part of each of said parachute elements and extending through said uniting member, a fixed support to which said cable is secured, a cord connected with said uniting member, and means connected with said last named cord permitting the peripheral portions of said parachute elements to collapse and extend rearwardly while said central portions are held by said cable.

7. A device of the character described comprising a tandem series of parachute elements of gradually diminishing sizes from the rear toward the front, a series of cords each having permanent engagement with the periphery of the rear parachute element and converging forwardly and having sliding engagement with the peripheries of the remaining parachute elements, a uniting member attached to the forward ends of said cords, a cable attached to a central part of each of said parachute elements and extending forwardly through said uniting member, a fixed support to which the forward end of said cable is attached, a cord connected with and extending forwardly from said uniting member, and a reel device connected with the forward end of said last named cord and controlling said first named cords to permit the peripheral portions of said parachute elements to collapse and extend rearwardly or to hold said parachute elements expanded in the form of parachutes, as desired.

8. In an airplane having a fuselage, a parachute element, a series of cords having permanent engagement with the periphery of said parachute element and converging forwardly, a cord having its rear end attached to said first named cords and its front end extending above and attached to said fuselage, means in connection with the upper side of the fuselage between the front end of said second cord and the front ends of said first named cords holding the rear portion of said second cord adjacent to the upper side of the rear end of the fuselage, and a device for disengaging said means from said second cord.

9. In an airplane having an elongated fuselage, a series of parachute elements of graduated sizes, a series of cords having permanent engagement with the periphery of the outer parachute element and converging forwardly and having sliding engagement with the peripheries of the remaining parachute elements, a cord having its rear end connected to the front ends of said first named cords, a device connecting the front end of said second cord with the fuselage, a cable attached to the central part of each of said parachute elements, a device connecting the front end of said cable with the fuselage adjacent to said device connecting said second cord with the fuselage, and means for holding rearward portions of said second cord and said cable in connection with the rear portion of the fuselage.

10. In an airplane having an elongated fuselage, a series of parachute elements of graduated sizes, a series of cords having permanent engagement with the periphery of the outer parachute element and converging forwardly and having sliding engagement with the peripheries of the remaining parachute elements, a cord having its rear end connected to the front ends of said first named cords, a device connecting the front end of said second cord with the fuselage, a cable attached to the central part of each of said parachute elements, a device connecting the front end of said cable with the fuselage adjacent to said device connecting said second cord with the fuselage, means for holding rearward portions of said second cord and said cable in connection with the rear portion of the fuselage, and connections for releasing said means from said second cord and said cable.

11. In an airplane having a fuselage, a parachute element, a flexible connection, flexible means connecting said parachute element with an intermediate upper portion of said fuselage, and a releasable device connecting said flexible means with the rear upper portion of the fuselage.

12. In an airplane having a fuselage, a parachute element, a flexible connection, flexible means connecting said parachute element with an upper intermediate portion of said fuselage, a releasable device connecting said flexible means with the rear upper portion of the fuselage, and connections for releasing said releasable device.

13. In an airplane having a fuselage, a series of parachute elements, flexible means connecting said parachute elements with an intermediate upper portion of the fuselage, and a releasable device for holding said flexible means in connection with the rear upper portion of the fuselage to retard the forward movement of the airplane.

14. In an airplane having a fuselage, a series of parachute elements, flexible means connecting said parachute elements with an intermediate upper portion of the fuselage, a releasable device for holding said flexible means in connection with the rear upper portion of the fuselage to retard the forward movement of the airplane, and connections for disengaging said devices from said flexible means to permit said parachute elements to extend vertically from the intermediate portion of the fuselage.

HARRY E. HONEYWELL.